Jan. 30, 1968     H. AUBERT ETAL     3,366,925
EQUIPMENT OF AN AUTOMOBILE OR LIKE VEHICLE
FOR THE DETECTION OF OBSTACLES
Filed June 25, 1964     2 Sheets-Sheet 1

Inventors
Henri Aubert
Joël Sokolowsky
By Stevens, Davis, Miller & Mosher
Attorneys Jan. 30, 1968   H. AUBERT ETAL   3,366,925
EQUIPMENT OF AN AUTOMOBILE OR LIKE VEHICLE
FOR THE DETECTION OF OBSTACLES
Filed June 25, 1964   2 Sheets-Sheet 2

Inventors
Henri Aubert
Joel Sokolowsky
By Stevens, Davis Miller & Mosher
Attorneys United States Patent Office 3,366,925
Patented Jan. 30, 1968

3,366,925
EQUIPMENT OF AN AUTOMOBILE OR
LIKE VEHICLE FOR THE DETECTION
OF OBSTACLES
Henri Aubert, 73 Rue de l'Abbe Groult, and Joël Sokolowsky, 12 Square Montsousris, both of Paris, Seine, France
Filed June 25, 1964, Ser. No. 377,904
Claims priority, application France, July 5, 1963, 940,534; Dec. 24, 1963, 958,279
9 Claims. (Cl. 340—32)

ABSTRACT OF THE DISCLOSURE

An apparatus for generating audible signals which are variable according to the distance between a vehicle and an obstacle with the variation constituting a measure of said distance. The apparatus including a first oscillator of a fixed frequency, a second oscillator of variable frequency varying with the distance between the vehicle and the obstacle, and means for producing a signal which is the result of the beating of the two oscillator outputs and the variation of which is readily detectible by the driver.

Figure 1:
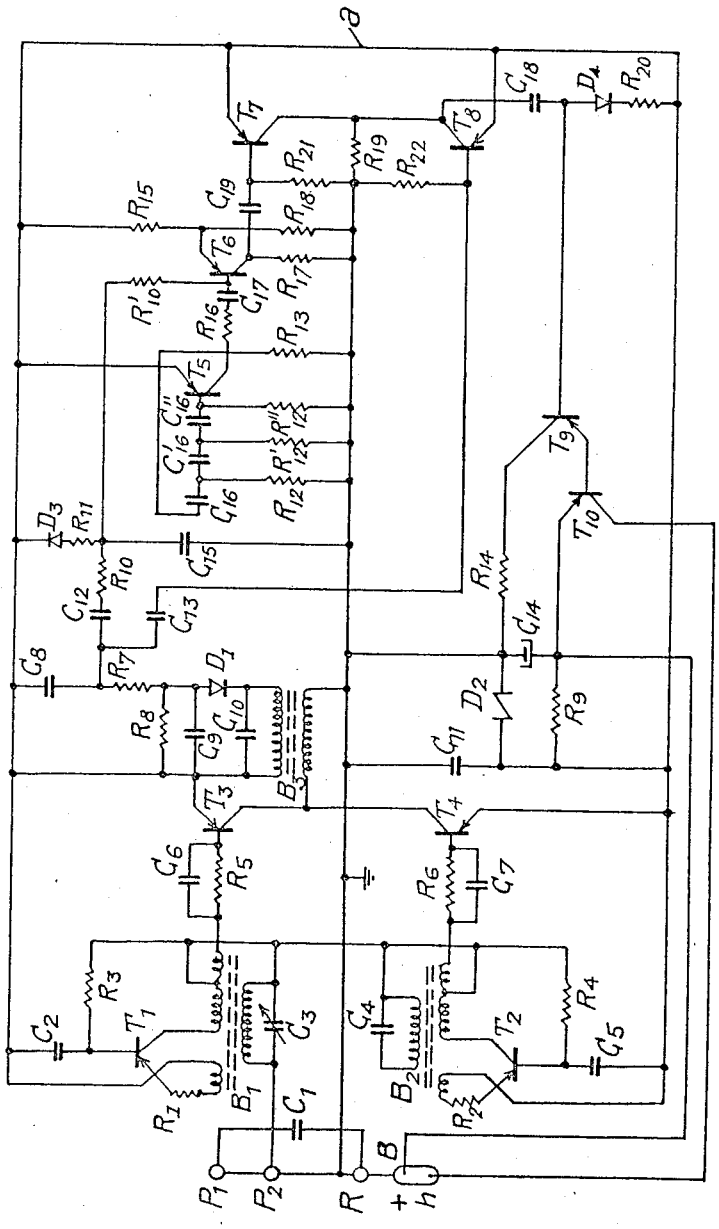

This invention is concerned with a device for an automobile or like vehicle, which enables the driver to detect the presence and evaluate the distance of obstacles standing in the way of said vehicle. This invention is particularly advantageous in its application to lorries, although it is not limited to this single application; but it is particularly useful in this case because the driver is then able to appreciate the distance of obstacles situated behind the back of the lorry (obstacles which he does not or cannot see) and thus drive backwards with safety.

It is already known to use the variation of capacity of electrical conductors—which variation is induced by the presence of an obstacle—for modifying the functioning of an electric circuit and obtaining a signal which indicates to the driver the presence and the distance of the obstacle.

In order to produce a perceivable variation of the signal over a sufficient range, the electric conductors or "feelers" possessing a changeable capacity form parts of an oscillator having a relatively high frequency; then for a good evaluation of the distance it is practical to derive an audible signal from the output oscillations of said oscillator by beating the output with the output of another oscillator having a fixed frequency. Thus as known by itself two oscillators are needed: one has a fixed or adjustable frequency and the other a variable frequency which is a function of the capacity of the above said conductors influenced by the obstacle. Means are used for deriving from the beat frequency some indications of the presence of the obstacle and eventually its distance.

Sensitivity in such an apparatus is in relation with the possibility of evaluating a small variation of the beat frequency and in particular a sufficiently small variation in the vicinity of the zero beat, i.e. it must be possible to distinguish a very low frequency and evaluate the variations thereof.

As this beat frequency is practically perceived in acoustical form by means of such an electro-acoustical transducer as a loudspeaker (situated for instance in the cab of the vehicle) the difficulty arises that a very low sound has to be produced; moreover the human ear cannot perceive infra-sounds.

The invention has for its object, in particular with the practical utilization in view, namely backward driving of lorries and like instances, an apparatus giving a convenient indication of distance to the obstacle over a sufficiently wide range; this indication must be easily recognizable by the driver and has to be especially clear when said distance is so small as to risk accidents or damage. The apparatus known up to now do not meet these requirements.

To this end the apparatus of the invention—which generates audible sounds varying according to the distance to the obstacle and constituting a measure of the same, whereas said sounds are obtained as known per se from the beat of two oscillators, one of which has a fixed frequency and the other a frequency varying according to the distance to the obstacle—is characterized by the fact that it includes several means for obtaining, from said beat, said audible sounds emitted with a respective one of several possible modes which are acoustically different and distinguishable by the ear, and selection members for selecting one of said means under control of the beat frequency. As will be seen later, two or even three such modes could be easily provided.

As examples of two such modes which are acoustically different and distinguishable by the ear one could mention:
A sound having a pure frequency or a sound mixed with another one or presenting a particular timbre;
A sound having a pure frequency or a sound pulsed or chopped at intervals;
A feeble sound or a loud sound;
A sound comprising exclusively deep-toned frequencies or a sound comprising exclusively high-pitched frequencies; with a marked frontier or interval between the two kinds of frequencies; etc.

In its reduction to practice said apparatus might be characterized by comprising a generator such as an oscillator or a multivibrator and means for modulating said generator by the beat, so as to hear, as a function of the beat frequency, the frequency of the generator modulated by the beat and, directly, the beat sound.

Now the particular difficulties of the problem will presently be set forth with a view to understand the merits of the solution of the invention. In the method that could be called the double beat method, the beat voltage directly modulates an oscillator having an audible frequency. It is possible to perceive the variations—even when they are low—of this voltage through the level variations of the sound emitted by the modulated oscillator.

As the beat frequency itself might become an audible and also a rather high-pitched frequency, this would lead, without appropriate precautions, to producing a signal which is difficult to understand as soon as the beat becomes a frequency which would not be very low in comparison with the frequency of the auxiliary oscillator. The modulation device would produce not only the frequency $f$ (inaudible when too low) of the beat itself and the frequency $F$ (audible and stable) of the auxiliary oscillator, but also the frequencies $F+f$ and $F-f$ and still, but with smaller amplitudes, frequencies of the type $nF \pm mf$, $n$ and $m$ being integers.

If $f$ is small with respect to $F$, the three frequencies $F-f$, and $F+f$ together form in fact the signal heard, that is a sound of frequency $F$ having an amplitude that varies slowly and sinusoidally at the rhythm of $f$. The other frequencies of the spectrum also included appear only for modifying the timbre of the sound and the envelope of the low rate of variation; this is no obstacle to the driver's evaluation of $f$, which is finally what is wanted.

But if $f$ is no longer negligible with respect to $F$, that is to say if $f$ is high enough for the different periods to be no longer perceived as events distinct in time, the resulting complex sound is no longer presented as a pure sound with a rhythmic variation, but as a Fourier expansion in which the ear is inclined to recognize several distinct frequencies. More especially there appear frequencies of the type $F-mf$ ($m$ being small); they seem to be distinct sounds having a decreasing pitch as the beat frequency increases.

If the vehicle is brought nearer the obstacle, a moment comes when the complex signal emitted, which ought to give the impression of a continuously rising sound, includes elemental sounds that on the contrary go down— which is a serious complication for the interpretation of the signal. In addition, at a certain distance, one will hear these falling sounds beating with the then audible frequency $f$, the latter being a rising sound. Lastly, when $f$ arrives in the vicinity of $F$, one will hear a particularly strong beat and its rhythm will gradually slow down; then one will head the frequency F alone (with an eventually altered timbre) and after that a beat having an increasing rhythm, and other like disturbing effects as well. Obviously enough such a diverse signal cannot be used advantageously by an ordinary driver to translate the approach of the vehicle to the obstacle.

In order to eliminate thes difficulties, it is suggested in the invention to use an auxiliary oscillator having a frequency F at least equal to 300 Hz. and preferably near 1000 Hz., so that the disturbing phenomena of falling sounds and spurious beats only appear when the beat $f$ has reached a high enough and well audible frequency, and moreover as soon as $f$ becomes well audible it is itself transmitted to the ear while the complex sound resulting from the modulation is cut off or suppressed. There are thus two very different, extreme modes, i.e. one in which the beat $f$ modulates the frequency F and another one in which the sound $f$ alone is perceived. Furthermore, it may be provided in the invention that in order to ensure continuity of the impression of the distance variation, the relaying of the comlex sound by a pure sound $f$ will gradually be established in a zone where $f$ is already well audible, while the defects of the complex sound are not yet manifest. This means the existence of an intermediate mode between the two extreme ones.

Continuity of the impression of distance variation is obtainable thanks to an opposite choice of the limits of the intermediate zone and of the attenuation rates of its components. In said zone the sound emitted has then the character of a sound having a rather well determined frequency; this frequency gradually rises while its timbre regularly changes. In the first part of the zone, the sound contains high components which are easily recognizable and which progressively transform into a sound with a rather pure timbre when the other limit of the zone is reached. Beyond the latter limit the axuiliary oscillator is without influence and the variation of the pitch of the sound received is a true image of the approach to the obstacle. This pitch tends towards a limit as the considered distance falls to zero, which permits its evaluation with a growing precision while this distance decreases. The particular advantage of the method is then evident.

According to a particular feature of one apparatus considered, the auxiliary oscillator is completely stopped by a bias voltage derived after detection from the beat $f$ which was transmitted through a low-pass filter. Thus there is ensured that for small distances this oscillator will not be perceived. However this is not absolutely necessary and it may suffice to have a gate blocked by the above-said bias voltage at the output of the oscillator. As regards the auxiliary oscillator or generator itself, it may be of any appropriate type (with dephasing resistor-capacitor cells, or with ordinary tuned circuits, or a relaxation multivibrator, etc.).

Figure 2:
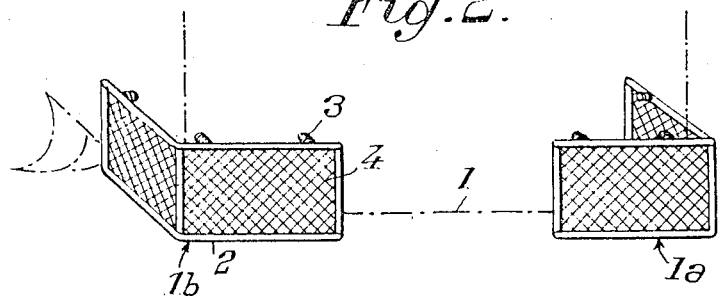
Figure 3:
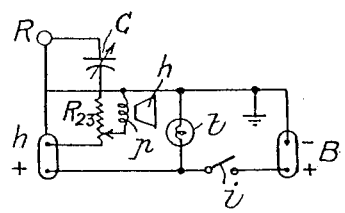

FIGS. 1 and 3 of the annexed drawings illustrate by way of non limitative example the circuits of an apparatus according to the invention and FIG. 2 shows an example of electric conductors or "feelers" apt to detect obstacles.

In the drawings, the letters C refer to capacitors, the letters R to resistors, the letters T to transistors and the letters D to diodes.

FIG. 1 shows a variable frequency oscillator, comprising a transistor $T_1$ and a multiple coil $B_1$, and a fixed frequency oscillator comprising a transistor $T_2$ and a multiple cail $B_2$. The two oscillators are similarly constructed and differ only by their tuning capacities: capacitor $C_4$ is fixed, whereas the capacity shunting $B_1$ is a variable one and includes the feelers $P_1$, $P_2$, their cables, $C_1$, and also the junction cable and the adjustable capacitor C situated in the control box of FIG. 3.

FIG. 3 shows the circuits of the control box, which is advantageously mounted on the dashboard. It contains the adjustment capacitor C and the connection cables which link the control box (FIG. 3) to the main box (FIG. 1); all the sheaths and screenings of the cables are connected to the mass of the vehicle as well as the negative ($-$) pole of the battery.

Thus the capacitor C acts only through an electric demultiplication thanks to the series capacitor $C_1$, and the shunt capacity of the cable. With a view to obtaining a good frequency stability, oscillation was established by the emitter with a degenerative reaction resistor $R_1$ having an appropriate value. The base of $T_1$ is decoupled by $C_2$ and biased through $R_3$ from the main voltage (6 v. D.C.) on conductor $a$, stabilized by a Zener diode $D_2$; in a similar manner the base of $T_2$ is decoupled by $C_5$ and biased by $R_4$.

The width of the synchronization range is lowered as much as possible through two separators with transistors $T_3$ and $T_4$, which are loaded by a transformer $B_3$ having its secondary tuned by a capacitor $C_{10}$, prior to mixing in diode $D_1$. The signals detected by the elements $D_1$, $C_9$, $R_8$ are then stripped of their high frequency component by a circuit $R_7$, $C_8$. Moreover in FIG. 1 the two mixers $T_7$ and $T_8$ are followed by a low frequency amplifier ($T_9$, $T_{10}$) that feeds to the loud-speaker through a connector $h$.

The beat voltage is forwarded through two channels, i.e. directly to the loud-speaker through $C_{13}$ and $T_8$ on the one hand and through $C_{12}$, $R_{10}$, $R'_{10}$ on the other hand to the modulator gate ($T_6$) which also receives the voltage delivered by an auxiliary oscillator ($T_5$), which is here of the dephasing type with several dephasing resistor-capacitor circuit ($R_{12}$–$C_{16}$, $R'_{12}$–$C'_{16}$, etc.). The modulation products are then forwarded to the loud-speaker through $C_{19}$ and $T_7$.

As regards the direct connection channel through $C_{13}$–$T_8$, it will be noted that the small resistance input of $T_8$ will form with $C_{13}$ a high-pass filter. The value of $C_{13}$ is so chosen that the beat voltage is allowed to be transmitted through this channel only when the beat frequency has a sufficient value to be clearly audible, so that amplifier $T_9$–$T_{10}$ is not uselessly loaded at a time when it has to transmit the modulation products originating from $T_7$ so long as the beat is too low. The filtering limit corresponds to the beginning of the transition zone intermediate between the two extreme modes.

The non-direct connection channel—that is so established that the beat voltage modulates an auxiliary voltage which is the one forwarded—it will be noted that the elements $R_{10}$, $C_{15}$ form a low-pass filter. The values of these elements are so chosen that the beat frequency is applied to the modulator gate $T_6$ only when this beat is so low that the drawbacks mentioned for the double beat method do not appear. As soon as the beat frequency is sufficiently high for it to be transmitted to the loudspeaker and as the mentioned drawbacks are not yet present, the filter $R_{10}$, $C_{15}$ ceases to apply the beat voltage to the modulator. The loudspeaker receives then only the beat voltage directly through $C_{13}$, $T_8$. This filtering limit corresponds to the end of the transition zone (intermediate zone) already mentioned.

It will also be noted that the modulator $T_6$ is biased through the emitter by means of the bridge $R_{15}$, $R_{16}$ in such manner that in the absence of a modulation voltage originating from $C_{12}$ said modulator is blocked and does not transfer to $T_7$ the auxiliary signal created by $T_5$.

From the foregoing it results that by application of the invention when the vehicle is getting near the obstacle the succession of events is as follows:

$C_3$ is adjusted in such manner that far away from the obstacle the apparatus produces no beat (this means that the oscillators $T_1$ and $T_2$ are synchronized). As the connection from $T_1$ and $T_2$ to $D_1$ is obtained through the separators $T_3$ and $T_4$ there is a small coupling between $T_1$ and $T_2$ and their synchronization range is very much reduced.

As soon as the distance to the obstacle becomes less than a ecrtain "threshold distance" this corresponds to the end of said synchronization range and a very deep-toned beat is produced which is by itself inaudible.

The beat voltage cannot follow channel $C_{18}$–$T_8$ (high-pass filter) but it reaches $T_6$ without any difficulty and in spite of $R_{10}$–$C_{15}$ (low-pass filter); each negative alternation of the beat momentarily unblocks $T_6$ which then transmits to $T_7$ a train of pulses having the auxiliary frequency imparted by $T_5$. The presence of these trains of pulses in the loudspeaker is a warning to the driver that the obstacle is situated at a distance equal to the threshold distance.

When the vehicle gets nearer the obstacle the trains of pulses acquire a more rapid rhythm, which informs the driver about the diminution of the distance.

For a somewhat shorter distance this rhythm becomes difficult to follow as such, but the fundamental frequency of the signals has become audible and takes up the role of the rhythm variation for informing the driver about the diminution of distance to the obstacle, the more the filter $C_{13}$, $T_8$ is then going to let the beat signal pass directly through.

For a shorter distance still the obstacle is in the transition zone and the signal received—which is the sum of the direct signal having an amplitude increasing with the beat frequency and the pulse trains (having diminishing duration and amplitude)—is heard as being apparently a signal of a well defined and increasing frequency and of a rather constant amplitude, but with a variable timbre. At the entry of the zone said timbre is rich in harmonics (particularly very high harmonics) and in distinct frequency called "partial frequencies" situated in the same range as the high harmonics, for the auxiliary frequency is itself high with respect to the fundamental frequency of the signal and is generally in no simple relation with said fundamental frequency. But these high frequencies are no hindrance for evaluating the fundamental frequency—and hence the distance to be ascertained—for they are quite distinct from the fundamental frequency.

As the vehicle gets nearer and nearer the obstacle and the beat frequency increases, the high-pitched sounds are more and more negligible and when the upper limit of the transition zone is reached they completely disappear, while only the pure beat frequency derived from $T_1$ and $T_2$ is audible. Beyond the transition zone the driver can still ascertain the lessening of the distance; in particular he feels the limit of the frequency variation coming and he is then able to locate the obstacle more and more accurately.

It goes without saying that in the circuits illustrated it falls within the scope of the invention to replace the oscillator $T_5$ by an oscillator of a different type, for its function is only to apply an auxiliary frequency signal to modulator $T_6$. It is also possible to replace transistor $T_6$ that plays the part of a modulator by a combination of diodes as known in itself. Also the amplifier $T_9$, $T_{10}$ might be constructed according to other circuits known by specialists. Whatever the particular embodiment may be, the invention provides an obstacle detector along the following lines: beating of two oscillators provided with a direct connection channel to an amplifier and a non-direct connection channel to the same amplifier, it being understood that the direct connection channel may include a high-pass filtering member and that the non-direct connection channel first transforms the beat waves into pulse trains, so long as the beat is too low to be audible but no more when it is audible, thanks to a filtering low-pass member placed before the transformation member.

Sensitivity of the apparatus of the invention is in direct relation with the bulk and shape of the space where the electrostatic field is established by the conducting parts which are incorporated in the capacitor influenced by the obstacle. Said parts are here designated by the name of "feelers".

According to cases one may use on feeler only or several feelers placed in an appropriate manner with the aim of protecting the vehicle in different places and in particular where no direct or a difficult sight would be obtainable from the driver's seat, and this with a maximum of efficiency and without impairing the driver's ease during his steering, and also as much as possible without destroying the aesthetic outward appearance of the vehicle.

FIG. 2 shows a possible arrangement of the feelers at the back of a lorry 1. Two elements 1a, 1b are provided preferably on either side or even at the corners, having therefor an appropriate rectangular form as shown. Each of them is supported by a frame 2 made of metal tubes or iron sections, which is fixed to the general chassis of the vehicle through the intermediate of insulators 3 which insure high frequency insulation with respect thereto. Each frame supports a full or perforated metal sheet 4, i.e. a grid or the like. The advantage of a grid or a perforated metal sheet is that the back lights, the registration number plate or other parts are not masked. Each of the elements 1a–1b might also be made of two distinct parts, assembled by threaded and screwed connections or by welding or by any other means.

The apparatus of the invention may be advantageously made of several parts. For instance it will include:

(1) A control box. This one is placed very visibly in the cab within reach of the driver's hand, for instance near the panel board. It contains (FIG. 3) a warning lamp $t$, a loudspeaker $h$, a general switch $i$ and an adjustable condenser C for adjusting the zero beat of the $T_1$ and $T_2$ oscillators of FIG. 1. In addition to the conectors corresponding to the two cables already mentioned there is a connector corresponding to the cable that transmits the battery voltage. An adjustable potentiometer $R_{23}$ is provided for the limitation of the sound level to an appropriate value.

(2) A main box contains the circuits of FIG. 1. This box is preferably fixed under the frame of the vehicle, about the back of the same and in the vicinity of the feelers.

(3) The feelers and their associated connections have already been described. The feelers are connected to the main box by coaxial cables with protective coatings.

For a proper working of the equipment it is necessary that, before any movement of the vehicle to be controlled by the apparatus, the driver must ascertained that the circuits are correctly adjusted. As "untuning" could be derived for instance from a small dent of a feeler resulting from a shock, the driver is able to correct the adjustment by means of the knob on the control box.

The main box is linked with the control box by a coaxial cable of suitable length. Another two-conductor cable transmits the battery voltage B from the control box to the main box and also in a reverse direction it picks up the acoustic signal and leads it to the loudspeaker. These two cables are provided with protective coatings.

The battery voltage B is 12 volts. The Zener diode $D_2$ and the resistor $R_9$ derive from this voltage a stable voltage of +6 v. on connection $a$. Diodes $D_3$ and $D_4$ are used as leaks for continuous voltage components which would otherwise impair the working of the circuits.

Here are, as an illustrative example, a list of values for the different elements of the circuits; the oscillation frequency of the oscillators and the beat-modulated generators were respectively about 510 kHz. and 1000 Hz.

List of values

| | |
|---|---|
| $R_1 = R_2 = 68$ ohms | $T_7 = T_8$: OC 70 |
| $R_3 = R_4 = 56$ kΩ | $T_9$: OC 92 |
| $R_5 = R_6 = 200$ kΩ | $T_{10}$: OC 16 |
| $R_7 = 22$ kΩ | $C_1 = 100$ pf. |
| $R_8 = 22$ kΩ | $C_2 = C_5 = 5$ nf. |
| $R_9 = 330$ Ω | $C_3 = 100$ pf. max. |
| $R_{10} = 22$ kΩ | $C_4 = 450$ pf. |
| $R'_{10} = 330$ kΩ | $C_6 = C_7 = 10$ nf. |
| $R_{11} = 22$ kΩ | $C_8 = 569$ pf. |
| $R_{12} = R'_{12} = R''_{12} = 4,7$ kΩ | $C_9 = 560$ pf. |
| $R_{13} = 4,7$ kΩ | $C_{10} = 200$ pf. |
| $R_{14} = 270$ ohms | $C_{11} = 1$ μf. |
| $R_{16} = 1000$ kΩ | $C_{12} = 0,1$ μf. |
| $R_{15} = 1$ kΩ | $C_{13} = 47$ nf. |
| $R_{17} = 4,7$ kΩ | $C_{14} = 3000$ μf. |
| $R_{18} = 4,7$ kΩ | $C_{15} = 10$ nf. |
| $R_{19} = 2,2$ kΩ | $C_{16} = C'_{10} = C''_{16} = 0,1$ μf. |
| $R_{20} = 470$ ohms | $C_{17} = 1$ μf. |
| $R_{21} = R_{22} = 330$ kΩ | $C_{18} = 0,1$ μf. |
| $R_{23} = 100$ Ω | $C_{19} = 47$ nf. |
| $p = 26$ Ω | $C = 100$ pf. max. |
| $B = 12$ v. | $D_1 = D_3 = D_4$: OA 85 |
| $T_1 = T_2 = T_3 =$ $T_4 = T_5 = T_6$ } OC 45 | $D_2$: OAZ 210 (Zener) |

Windings on ferrite pot cores:

| | | Turns |
|---|---|---|
| $B_1$ and $B_2$ | Primary | 100 |
| | 1st secondary | 8 |
| | 2nd secondary | 20 and 2 |
| and | | |
| $B_3$ | Primary | 20 |
| | Secondary | 120 |

The invention is not limited to the example above described and illustrated and variants could be contemplated thanks to the substitution of equivalent elements.

In particular the arrangement comprising a control box plus a main box may be modified and replaced by any other equivalent combination. It is also possible to provide for an abrupt change between the two extreme modes. To this end it suffices to omit the low-pass and high-pass filters and eventually modify the frequency of the generator.

Instead of an oscillator as described one could very well use a multivibrator which would receive the beat voltage through a low-pass filter: thus if the beat frequency is low the multivibrator is triggered and produces a series of oscillation trains having a repetition rate equal to the beat frequency and a well audible natural frequency; on the contrary if the beat frequency is too high, the voltage produced has too small a value for triggering the multivibrator. In other words, in the later mode, the multivibrator itself stops, whereas in the example of the drawings the transmission of the oscillations produced by the generator was blocked.

Moreover in the circuits of the apparatus according to the invention a frequency changing unit could be adjoined to the oscillator acted upon by the obstacle; the frequency-changed signal then provides the beat with a fixed frequency oscillator. This could be elaborated in such manner that the link between the feelers and the variable oscillator would be of a wireless nature instead of an ordinary connction. This solution could be of advantage in the case of long convoys and for example for railway trains.

The apparatus for a lorry or like vehicle has to be devised in such manner that the energy radiated at a long distance be negligible and inferior to the value imposed by the regulations in force (the working frequency being chosen so as not to disturb the radio receivers nearby and in particular the receiver of the lorry). This is easily obtained.

It is interesting to remark that in practice, for distances between feelers and obstacles greater than 1 meter the capacity variation acting upon the variable oscillator is approximately an exponential one and is negligible beyond 2 meters, which eliminates the influence of obstacles, and even huge ones, situated outside the zone of the possible backward movements of the vehicle.

What we claim is:

1. An apparatus for generating audible sounds which are variable according to the distance between a vehicle and an obstacle and constitute a measure of this distance, said apparatus comprising a first oscillator having a fixed frequency, a second oscillator including a capacitor electrically connected to electric conductors arranged on the vehicle in such manner that the frequency of the second oscillator varies with the distance to the obstacle, circuit means operatively connected to the outputs of said first and said second oscillators for producing an electric signal which is the resulting beat of the two oscillator outputs, generator means for producing electric oscillations, means for modulating said generator by said beat signal, and means for producing audible sounds which vary according to the beat frequency, the generator oscillations modulated by the beat signal and the beat sound directly emitted.

2. An apparatus as claimed in claim 1, wherein the frequency of the generator is above 300 cycles.

3. An apparatus for generating audible sounds which are variable according to the distance between a vehicle and an obstacle and constitute a measure of this distance, said apparatus comprising a first oscillator having a fixed frequency, a second oscillator including a capacitor electrically connected to electric conductors arranged on the vehicle in such manner that the frequency of the second oscillator varies according to the distance of the obstacle, circuit means connected to the output of both said oscillators for producing an electric signal which is the resulting beat of the two oscillator outputs, generator means for producing electric oscillations, means for modulating said generator by said beat signal, means for producing, as audible sounds which vary according to the beat frequency, the generator oscillations modulated by the beat signal and the beat signal directly emitted, and selection means acting on the latter means, for selectively emitting the modulated oscillation of the generator, the beat signal, and a gradual mixture of them, under control of the frequency of the beat signal.

4. An apparatus for generating audible sounds which are variable according to the distance between a vehicle and an obstacle and constitute a measure of this distance, said apparatus comprising a first oscillator having a fixed frequency, a second oscillator including a capacitor electrically connected to electric conductors arranged on the vehicle in such manner that the frequency of the second oscillator varies according to the distance to the obstacle, circuit means connected to the output of said oscillators for producing an electric signal which is the resulting beat of the two oscillator outputs, an amplifier of acoustic frequency signals, an acoustical sound reproducer connected at the output of said amplifier, two connection channels in parallel and connecting the amplifier input to the output of said circuit means one of said channels being a direct channel adapted to directly transmit said beat signal, the other channel being a nondirect channel and including means for generating electric oscillations, modulation means for modulating the generator by the beat signal and transmission means for forwarding the modulated generator signal to the amplifier input.

5. An apparatus as claimed in claim 4, wherein the direct channel includes a high pass filter and wherein also the input of the modulation means in the non-direct channel includes a low-pass filter, the transmission means in the latter channel being provided with blocking means adapted to block the transmission when the amplitude of the signal beat is practically nil.

6. An apparatus as claimed in claim 4, wherein said generator is at rest in the absence of any appreciable pulse applied to its input and wherein the direct channel includes a high pass filter and wherein also the input of the modulating means of the nondirect channel includes a high pass filter arranged in such manner that, when the amplitude of the signal transmitted through said filter is practically nil, the generator stops oscillation.

7. An apparatus as claimed in claim 6, wherein said generator is a multivibrator.

8. An apparatus for generating audible signals which vary according to the distance between a vehicle and an obstacle with the variation of said signal constituting a measure of said distance, said apparatus comprising conductor means on said vehicle, a first oscillator having a fixed frequency, a second oscillator having a variable frequency, capacitor means electrically connected to said conductor means and said second oscillator in such manner that the frequency of the second oscillator varies with the distance to the obstacle, circuit means connected to the output of both said oscillators and producing an electric signal which is the resulting beat of the outputs of said two oscillators, means for extracting from said beat signals first audible sounds emitted, means for triggering by said beat signal second audible sounds which are acoustically different and distinguishable from said first audible sounds, and selection means for automatically selecting one of said means under the control of the frequency of the beat signal.

9. An apparatus as claimed in claim 8 further comprising an adjustable capacitor in shunt with the capacitor of the second oscillator, said adjustable capacitor providing for zero setting the beat of the two oscillators and being accessible to the driver.

References Cited
UNITED STATES PATENTS

| | | | |
|---|---|---|---|
| 1,870,181 | 8/1932 | Mallory | 340—38 |
| 1,965,147 | 7/1934 | Marvel | 340—258 |

THOMAS B. HABECKER, *Acting Primary Examiner.*

NEIL C. READ, *Examiner.*

D. L. TRAFTON, *Assistant Examiner.*